US008171545B1

(12) United States Patent
Cooley et al.

(10) Patent No.: US 8,171,545 B1
(45) Date of Patent: May 1, 2012

(54) PROCESS PROFILING FOR BEHAVIORAL ANOMALY DETECTION

(75) Inventors: Shaun Cooley, El Segundo, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1182 days.

(21) Appl. No.: 11/674,934

(22) Filed: Feb. 14, 2007

(51) Int. Cl.
*H04L 29/06* (2006.01)
(52) U.S. Cl. ......................................................... 726/22
(58) Field of Classification Search .................. None
See application file for complete search history.

(56) References Cited

U.S. PATENT DOCUMENTS

| | | | | |
|---|---|---|---|---|
| 6,681,331 | B1 * | 1/2004 | Munson et al. | 726/23 |
| 6,963,983 | B2 * | 11/2005 | Munson et al. | 726/5 |
| 2002/0138753 | A1 * | 9/2002 | Munson | 713/200 |
| 2003/0188189 | A1 * | 10/2003 | Desai et al. | 713/201 |
| 2003/0200462 | A1 * | 10/2003 | Munson | 713/200 |
| 2004/0221173 | A1 * | 11/2004 | Moyer et al. | 713/200 |
| 2007/0180522 | A1 * | 8/2007 | Bagnall | 726/22 |
| 2008/0047013 | A1 * | 2/2008 | Claudatos et al. | 726/24 |

OTHER PUBLICATIONS

Linda Lankewicz and Mark Benard. "Real Time Anomaly Detection Using a Nonparametric Pattern Recognition Approach." Proceedings, IEEE Symposium on Research in Computer Security and Privacy, 1990.*

* cited by examiner

*Primary Examiner* — Nathan Flynn
*Assistant Examiner* — Michael R Vaughan
(74) *Attorney, Agent, or Firm* — Brill Law Office; Jeffrey Brill

(57) ABSTRACT

An anomalous process behavior manager uses statistical information concerning running processes to detect and manage process behavioral anomalies. The anomalous process behavior manager collects per process statistical data over time, such as resource allocation statistics and user interaction statistics. Current collected statistical data is analyzed against corresponding historical statistical data to determine whether processes are behaving in expected ways relative to past performance. Appropriate corrective steps are taken when it is determined that a process is behaving anomalously. For example, the process's blocking exclusions can be revoked, the process can be uninstalled, the process and/or the computer can be scanned for malicious code, the user can be alerted and/or relevant information can be shared with other parties.

20 Claims, 1 Drawing Sheet

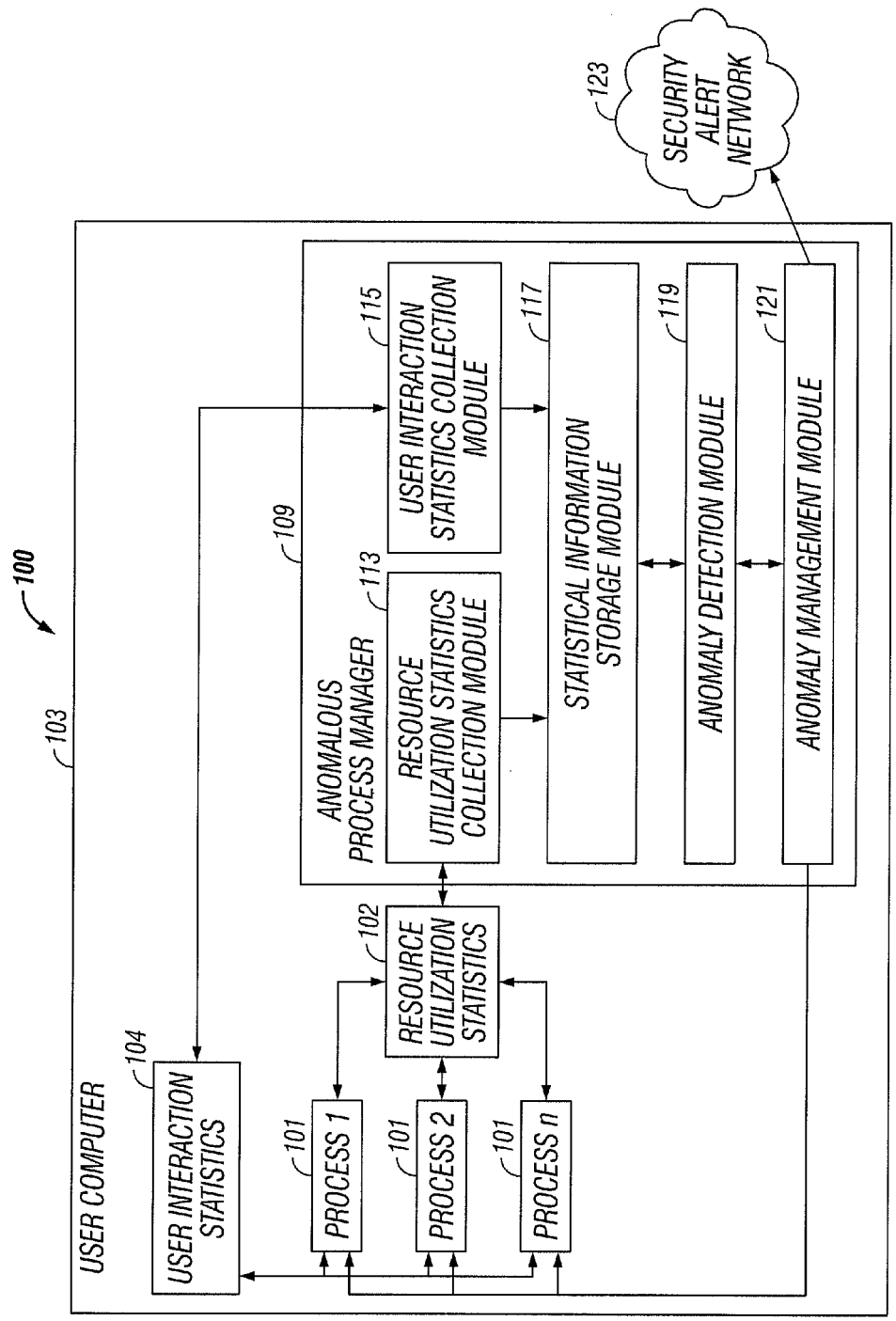

PROCESS PROFILING FOR BEHAVIORAL ANOMALY DETECTION

TECHNICAL FIELD

This invention pertains generally to computer security, and more specifically to profiling resource utilization and user interaction to detect software process behavioral anomalies.

BACKGROUND ART

In most client security applications that are installed on an end user's computer (for example, personal firewalls and antivirus software), the user and/or manufacturer of the security application defines exclusions to the blocking policies of the security products. For example, the user might define an exclusion allowing a trusted personal accounting program to transmit financial data to the Internet, or the manufacturer of anti-virus software may define an exclusion allowing its own update management program to overwrite anti-virus signatures stored on the user's hard disk. In other words, certain trusted processes are allowed to perform activities which the security software, by default, blocks processes from performing. These exclusions to blocking policies are for well known, trusted, applications. A resulting problem is that these exclusions are often wrongly carried over across upgrades, plug-in changes, and worst of all, unauthorized attachment to the trusted processes by malicious code, such as a computer virus or worm.

The majority of processes running on an end user computer have a standard pattern of system resource utilization and user interaction. For example, a process that has never used the network is unlikely to start using the network. Likewise, an application that uses the network heavily, but has never enumerated every file on the hard drive is unlikely to start enumerating the hard drive.

What is needed are methods, computer readable media and computer systems for detecting anomalous behavior by previously trusted processes, so that appropriate corrective action can be taken, such as revoking the blocking exclusions.

SUMMARY

Statistical information concerning application behavior is collected over time to determine the standard behavior of known applications. The applications are monitored as they run on a computer, and current behavioral information is collected. The current behavior is compared to the known, expected behavior, in order to determine when an application is behaving anomalously. When anomalous application behavior is detected, appropriate corrective steps are taken.

More specifically, an anomalous process behavior manager collects per process statistical data over time, such as resource allocation statistics and user interaction statistics. Current collected statistical data is analyzed against corresponding historical statistical data to determine whether processes are behaving in expected ways relative to past performance. Appropriate corrective steps are taken when it is determined that a process is behaving anomalously. For example, the process's blocking exclusions can be revoked, the process can be uninstalled, the process and/or the computer can be scanned for malicious code, the user can be alerted and/or relevant information can be shared with other parties.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a block diagram illustrating a system for utilizing resource utilization and user interaction statistics to detect and manage software process behavioral anomalies, according to some embodiments of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a system 100 for utilizing resource utilization statistics 102 and user interaction statistics 104 to detect and manage software process 101 behavioral anomalies, according to some embodiments of the present invention. It is to be understood that although various components of the system are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

An anomalous process behavior manager 109 detects behavioral anomalies in applications 101 installed on a client computer 103 without requiring machine-external input. As noted above, processes 101 running on user computers 103 tend to have a standard pattern of system resource utilization and user interaction. By gathering per process 101 resource utilization and user interaction statistical data 102, 104 over time, it is possible to determine when a process 101 is behaving in an unexpected way. For example, if a process 101 that never access the network starts doing so extensively, this would indicate that perhaps the process 101 has been infected with malicious code. On a similar note, applications 101 that never prompt users to enter a lot of information (e.g., personal data) do not generally start doing so.

The anomalous process behavior manager 109 tracks per process system utilization statistics 102 along with user interaction statistics 104 to detect anomalous behavior. Thus, each individual application 101 is identified by its behavioral profile, as opposed to the use of static characteristics such as file name or hashes of parts of the executable. When used, for example, to identify an application 101 that is subject to security policy exclusions, this technique is superior to the use of static application 101 characteristics, because the application 101 can become compromised without these static characteristics changing. Frequently, a user will notice such behavior as "my system and/or network is slower than normal" or "application X, which has always worked before, suddenly stopped working properly or started crashing," which the user knows based on their memory of "how it used to work." The anomalous process behavior manager 109 takes the concept of "how it used to work" and automates it, so as to detect and manage anomalous process 101 behavior.

As illustrated in FIG. 1, the anomalous process behavior manager 101 comprises a resource utilization statistics collection module 113, a user interaction statistics collection module 115, a statistical information storage module 117, an anomaly detection module 119 and an anomaly management module 121. It is to be understood that although these modules 113, 115, 117, 119 and 121 are illustrated in FIG. 1 as a separate entities, each illustrated module represents a collection of functionalities which can be implemented as software, hardware, firmware or any combination of these. The functionalities performed by these modules are described in detail below.

In some embodiments, the anomalous process behavior manager 109 uses three time periods. The first time period (T1) is the time between statistics 102, 104 collections. That is to say, the resource utilization statistics collection module 113 and the user interaction statistics collection module 115 collect their respective per process 101 statistics 102, 104 once per T1. The second time period (T2) is the time between attempts to detect process 101 anomalies (i.e., the anomaly detection module 119 runs every T2). The third time period (T3) is the history window, which is the amount of time for which statistical information 102, 104 is maintained. In some embodiments, resource allocations statistics 102 and user interactions statistics 104 are collected at different frequencies, or at the same frequency but at different times. It is to be understood that the specific lengths of the time periods are a variable design choice. Additionally, not all embodiments use three distinct time periods as such.

As will be readily apparent to those of ordinary skill in the art in light of this specification, the time periods simply describe how often statistics 102, 104 are gathered, how often attempts to detect anomalous process 101 behavior are made, and how much historical statistical data 102, 104 to maintain. The times informing the performance of these functions can vary from embodiment to embodiment, as well as from process 101 to process 101, and even process 101 type to process 101 type. All such variations are within the scope of the present invention.

The resource utilization statistics collection module 113 collects per process system resource utilization statistics 102. The implementation mechanics of this module 113 varies widely between various operating systems. For Microsoft Windows®, this module 113 can be implemented as a periodic read of the Windows Management Instrumentation ("WMI") tables. The WMI tables contain current per process system resource utilization information, but they do not store historical information. Thus, in a Microsoft Windows® embodiment of the present invention, the resource utilization statistics collection module 113 can read the WMI tables every T1. In a UNIX° embodiment, the resource utilization statistics collection module 113 could be implemented similarly to the "top" application, or directly in the kernel. The specific implementation details of collecting per process resource utilization statistics 102 under various operating systems is know to those of ordinary skill in the relevant art, and their usage within the context of the present invention will be readily apparent to those of such a skill level in light of this specification.

Examples of per process system resource utilization statistics 102 that the resource utilization statistics module 113 collects are: a) central processing unit usage; b) disk reads (e.g., count or bytes) per T1; c) disk writes (e.g., count or bytes) per T1; d) total disk input/output per T1; e) disk access span (e.g., breadth of disk location accesses by an application, such as accesses to a few folders, to a particular folder tree (e.g. My Documents), to a particular drive, or to a wide range of drives and folders, including separate characterizations for read locations versus write locations); f) network access/ usage (e.g., open network connections, listening network "connections," new network connections per T1, closed network connections per T1); g) memory usage (e.g., memory allocated, virtual memory allocated); h) kernel objects (e.g., access tokens, communication devices, events, mutexes, semaphores, jobs, named pipes, process handles, sockets, threads, waitable timers); i) files opened per T1 (calculated); j) files closed per T1 (calculated); k) dynamic link libraries (DLLs) loaded by the process 101 (e.g., stability of the DLL working set—does the process 101 have a constant working set after initial startup, does it have a small number of primary working sets, or does the working set(s) vary?); l) processes 101 launched by the process 101; m) Graphics Device Interface ("GDI") objects (e.g., windows, dialogs, child controls, etc.); and n) method of exiting (e.g., exit code or crash). Of course, the specific resource allocation statistics 102 to collect are variable design parameters, and can vary from process 101 to process 101 and embodiment to embodiment as desired.

The user interaction statistics collection module 115 collects per process 101 user interaction statistics 104. As with the resource utilization statistics collection module 113, the implementation mechanics of the interaction statistics collection module 115 varies widely between various operating systems. For example, for Microsoft Windows® the implementation could be as simple as a CBT Windows Hook, or as complicated as a kernel driver. As with collecting per process resource utilization statistics 102, the specific implementation details of collecting user interaction statistics 104 under various operating systems is know to those of ordinary skill in the relevant art, and their usage within the context of the present invention will be readily apparent to those of such a skill level in light of this specification.

Examples of user interaction statistics 104 collected by the user interaction statistics collection module 115 are: a) types of user interface components displayed (such as informational, inquisitive, or high priority—informational includes windows/dialogs that do not require user input, inquisitive include windows/dialogs that require user input (yes/no dialogs, windows with input boxes, checkboxes, etc.), high priority includes windows/dialogs that are system modal or top most); b) method of notification (e.g., details about how the user interface component was brought to the user's attention—this can include things such as flashed, set to foreground, info-tip, system modal, top-most without focus, or background without focus); c) duration of notification (e.g., how long is the average user interface component from this application displayed?); d) scope of average user response (e.g., how many times did the user click the mouse or use the keyboard before this user interface component went away?); and e) time of day user interface component is displayed. The specific user interaction statistics to collect are variable design parameters.

The statistical information storage module 117 stores collected statistical information 102, 104. The storage implementation can range from a full blown database to a neural network or PCA, to simply storing per process 101 running averages for the last detection period (T2) and per process 101 running averages for the overall history window (T3). Where feasible on the user's computer 103, a database is a useful way to store and access collected statistical information 102, 104. However, since the volume of information in question can be high, a database is not a feasible option on some user computer systems 103. In such cases, simple running averages (per process 101 and optionally per process 101 type, etc.) can be used. In other embodiments, only the most recently gathered statistics 102 and 104 and per process 101 averages for T3 are stored. In any case, the storage mechanism is typically implemented such that old data can be easily dropped, as the history window is refreshed every T3.

The specific statistical data 102, 104 to store is a variable design parameter. The specific implementation mechanics to use for doing so are a variable design choice. The implementation mechanics of storing resource allocation and user interaction statistics 102, 104 are known to those of ordinary skill in the relevant art, and their usage within the context of the present invention will be readily apparent to those of such a skill level in light of this specification.

The anomaly detection module 119 analyzes collected statistics 102 in order to detect process anomalies. In one embodiment, this module 119 executes every T2, to check if the average behavior of specific processes 101 over the most recent T2 interval for which data exists is within T3 standards. This could be as simple as a comparison with a difference threshold, to as complicated as passing the current values to the trained neural network or performing a time series analysis. For example, in one embodiment the anomaly detection module 119 simply compares the current average per process statistics 102, 104 (i.e., the running average statistics 102, 104 for the most recent T2 for each process 101 being monitored) to the per process 101 average over T3, to determine whether the current statistics 102, 104 differ from the T3 average by more than an acceptable range of variation. In other embodiments, more complicated analyses are performed, as noted above. Note that the comparison of T2 running averages with T3 running averages is simply one option. For example, in other embodiments current T1 statistics can be compared to T3 running averages.

Of course, what statistics 102, 104 to analyze and what ranges of variation are considered to be normal and/or anomalous are variable design parameters. Tighter and looser levels of variation can be classified as normal and/or anomalous for different types of gathered statistics 102, 104 and/or different processes 101 as desired. Additionally, what processes 101 to monitor, and whether to compare gathered statistics 102, 104 for a given process 101 to T3 data for that process 101 or for multiple processes 101 (e.g., all monitored processes 101 of that type) are variable design parameters. When a process is deemed to be behaving anomalously, the anomaly detection module 119 reports the detected anomalous process activity to the anomaly management module 121.

The anomaly management module 121 takes appropriate action in response to a determination that a process 101 is behaving anomalously. The specific action to take can vary as desired. For example, the anomaly management module 121 can revoke the process's 101 blocking exclusions, delete the process 101 from the computer 103, scan the process and/or computer 103 for malicious code, notify the user and/or other processes 101, share the information with a computer security alert network 123, etc.

The implementation specifics of the anomaly management module 121 are informed by the functions it performs. For example, in embodiments in which the only response to detecting anomalous behavior is to notify the user, the anomaly management module 121 can consist of a simple notification user interface. In other embodiments, this module 119 can be implemented so as to take further action, such as scanning the process 101 (and optionally all DLLs loaded therein) for malicious code, closing the process's 101 network connections, suggesting to the user not to input any financial information to the application 101, uninstalling the process 101, rolling back the process 101 to an earlier version, etc.

Another exciting possibility is the sharing of gathered statistical data 102, 104 and detected anomalous process 101 behavior with a central security server 121 or through a peer to peer trusted community (not illustrated), so that other users (e.g., friends or subscribers to a network of "experts") can benefit from the profiling activities of others (and the information can be aggregated and redistributed).

The implementation mechanics of taking the responsive actions described above are known to those of ordinary skill in the relevant art, and their usage within the context of the present invention will be readily apparent to those of such a skill level in light of this specification.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for using statistical information concerning running processes to detect and manage process behavioral anomalies, the method comprising the steps of:
   granting, by a computer, an exclusion to a security policy for at least one process, such that the at least one process is allowed to perform activities on the computer which are blocked by the security policy for non-excluded processes;
   collecting statistical data concerning external interaction of the at least one process that was granted the exclusion to the security policy;

analyzing at least some current collected statistical data against corresponding historical statistical data for the at least one process;

responsive to results of the analyzing step, determining that the at least one process is behaving anomalously with respect to external interaction; and responsive to determining that the at least one process is behaving anomalously with respect to external interaction, revoking the exclusion to the security policy for the at least one process.

2. The method of claim 1 wherein collecting statistical data concerning external interaction of at least one process further comprises performing at least one step from a group of steps consisting of:

collecting per process resource allocation statistics for at least one process;

collecting per process user interaction statistics for at least one process;

collecting per process resource allocation statistics for at least one process once per a specified period of time; and collecting per process user interaction statistics for at least one process once per a specified period of time.

3. The method of claim 1 further comprising:

storing at least some per process statistical data concerning the at least one process.

4. The method of claim 3 wherein storing at least some per process statistical data concerning the at least one process further comprises storing at least some statistical data of at least one type from a group of statistical data types consisting of:

most recently collected statistical data concerning at least one process;

at least one per process running average of statistical data collected over a given time period;

at least one per process running average of statistical data collected over a first time period and at least one corresponding per process running average of statistical data collected over a second time period, the second time period being longer than the first time period;

at least some most recently collected per process type statistical data;

at least one running average of per process type statistical data; and at least one running average of per process type statistical data collected over a first time period, and at least one corresponding running average of per process type statistical data collected over a second time period, the second time period being longer than the first time period.

5. The method of claim 3 wherein storing at least some per process statistical data concerning the at least one process further comprises performing at least one step from a group of steps consisting of:

updating at least some most recently collected per process statistical data once per a given time period;

updating at least one per process running average of statistical data once per a given time period;

updating at least one per process running average of statistical data once per a first time period, and updating at least one corresponding per process running average of statistical data once per a second time period, the second time period being longer than the first time period;

updating at least some most recently collected per process type statistical data once per a given time period;

updating at least one running average of per process type statistical data once per a given time period; and updating at least one running average of per process type statistical data once per a first time period, and updating at least one corresponding running average of per process type statistical data once per a second time period, the second time period being longer than the first time period.

6. The method of claim 1 wherein analyzing at least some current collected statistical data against corresponding historical statistical data for the at least one process further comprises performing at least one step from a group of steps consisting of:

comparing at least some most recently collected per process statistical data to at least one corresponding per process running average of statistical data;

comparing at least one per process running average of statistical data collected over a first time period to at least one corresponding per process running average of statistical data collected over a second time period, the second time period being longer than the first time period;

comparing at least some most recently collected per process type statistical data to at least one corresponding running average of per process type statistical data;

comparing at least one running average of per process type statistical data collected over a first time period to at least one corresponding running average of per process type statistical data collected over a second time period, the second time period being longer than the first time period;

comparing at least a first set of statistical data to at least a corresponding second set of statistical data once per a given time period;

processing the at least some current collected statistical data by a trained neural network once per a given time period; and performing a time series analysis of the at least some current collected statistical data once per a given time period.

7. The method of claim 1 wherein determining that the at least one process is behaving anomalously responsive to the results of the analyzing step further comprises:

responsive to determining that at least one current collected statistical datum is not within an excepted range of variation relative to at least one corresponding historical statistical datum, concluding that the at least one process is behaving anomalously.

8. The method of claim 1 further comprising performing at least one additional step concerning the at least one process responsive to determining that the at least one process is behaving anomalously, the at least one additional step being from a group of steps consisting of:

uninstalling the at least one process;

rolling back the at least one process to an earlier version;

scanning the at least one process for malicious code;

scanning at least one dynamic link library associated with the at least one process for malicious code;

scanning at least one computer on which the at least one process is executing for malicious code;

sharing profiling information concerning the at least one process with an external source;

alerting at least one associated user;

transmitting corresponding information concerning the at least one process to at least one of: 1) at least one additional process and 2) an external source; and closing at least one network connection associated with the at least one process.

9. At least one non-transitory computer readable medium containing a computer program product for using statistical information concerning running processes to detect and manage process behavioral anomalies, the computer program product comprising program code for performing a method, comprising:

granting an exclusion to a security policy for at least one process, such that the at least one process is allowed to perform activities on the computer which are blocked by the security policy for non-excluded processes;

collecting statistical data concerning external interaction of the at least one process that was granted the exclusion to the security policy;

analyzing at least some current collected statistical data against corresponding historical statistical data for the at least one process;

responsive to results of the analyzing step, determining that the at least one process is behaving anomalously with respect to external interaction; and responsive to determining that the at least one process is behaving anomalously with respect to external interaction, revoking the exclusion to the security policy for the at least one process.

10. The computer program product of claim 9 wherein the collecting statistical data concerning external interaction of at least one process further comprises performing at least one step from a group of steps consisting of:

collecting per process resource allocation statistics for at least one process;

collecting per process user interaction statistics for at least one process;

collecting per process resource allocation statistics for at least one process once per a specified period of time; and collecting per process user interaction statistics for at least one process once per a specified period of time.

11. The computer program product of claim 9 further comprising:

storing at least some per process statistical data concerning the at least one process.

12. The computer program product of claim 11 wherein the storing at least some per process statistical data concerning the at least one process further comprises storing at least some statistical data of at least one type from a group of statistical data types consisting of:

most recently collected statistical data concerning at least one process;

at least one per process running average of statistical data collected over a given time period;

at least one per process running average of statistical data collected over a first time period and at least one corresponding per process running average of statistical data collected over a second time period, the second time period being longer than the first time period;

at least some most recently collected per process type statistical data;

at least one running average of per process type statistical data; and at least one running average of per process type statistical data collected over a first time period, and at least one corresponding running average of per process type statistical data collected over a second time period, the second time period being longer than the first time period.

13. The computer program product of claim 11 wherein the storing at least some per process statistical data concerning the at least one process further comprises performing at least one step from a group of steps consisting of:

updating at least some most recently collected per process statistical data once per a given time period;

updating at least one per process running average of statistical data once per a given time period;

updating at least one per process running average of statistical data once per a first time period, and updating at least one corresponding per process running average of statistical data once per a second time period, the second time period being longer than the first time period;

updating at least some most recently collected per process type statistical data once per a given time period;

updating at least one running average of per process type statistical data once per a given time period; and updating at least one running average of per process type statistical data once per a first time period, and updating at least one corresponding running average of per process type statistical data once per a second time period, the second time period being longer than the first time period.

14. The computer program product of claim 9 wherein the analyzing at least some current collected statistical data against corresponding historical statistical data for the at least one process further comprises performing at least one step from a group of steps consisting of:

comparing at least some most recently collected per process statistical data to at least one corresponding per process running average of statistical data;

comparing at least one per process running average of statistical data collected over a first time period to at least one corresponding per process running average of statistical data collected over a second time period, the second time period being longer than the first time period;

comparing at least some most recently collected per process type statistical data to at least one corresponding running average of per process type statistical data;

comparing at least one running average of per process type statistical data collected over a first time period to at least one corresponding running average of per process type statistical data collected over a second time period, the second time period being longer than the first time period;

comparing at least a first set of statistical data to at least a corresponding second set of statistical data once per a given time period;

processing the at least some current collected statistical data by a trained neural network once per a given time period; and performing a time series analysis of the at least some current collected statistical data once per a given time period.

15. The computer program product of claim 9 wherein the determining that the at least one process is behaving anomalously responsive to the results of the analyzing step further comprises:

responsive to determining that at least one current collected statistical datum is not within an excepted range of variation relative to at least one corresponding historical statistical datum, concluding that the at least one process is behaving anomalously.

16. The computer program product of claim 9 further comprising performing at least one additional step concerning the at least one process responsive to determining that the at least one process is behaving anomalously, the at least one additional step being from a group of steps consisting of:

uninstalling the at least one process;

rolling back the at least one process to an earlier version;

scanning the at least one process for malicious code;
scanning at least one dynamic link library associated with the at least one process for malicious code;
scanning at least one computer on which the at least one process is executing for malicious code;
sharing profiling information concerning the at least one process with an external source;
alerting at least one associated user;
transmitting corresponding information concerning the at least one process to at least one of: 1) at least one additional process and 2) an external source; and
closing at least one network connection associated with the at least one process.

17. A computer system for using statistical information concerning running processes to detect and manage process behavioral anomalies, the computer system comprising:
    means for granting an exclusion to a security policy for at least one process, such that the at least one process is allowed to perform activities on the computer which are blocked by the security policy for non-excluded processes;
    means for collecting statistical data concerning external interaction of the at least one process that was granted the exclusion to the security policy;
    means for analyzing at least some current collected statistical data against corresponding historical statistical data for the at least one process;
    means for, responsive to results of the analyzing step, determining that the at least one process is behaving anomalously with respect to external interaction; and
    means for, responsive to determining that the at least one process is behaving anomalously with respect to external interaction, revoking the exclusion to the security policy for the at least one process.

18. The computer system of claim 17 further comprising:
    means for storing at least some per process statistical data concerning the at least one process.

19. The computer system of claim 17 wherein the means for determining that the at least one process is behaving anomalously responsive to the results of the analyzing step further comprise:
    means for, responsive to determining that at least one current collected statistical datum is not within an excepted range of variation relative to at least one corresponding historical statistical datum, concluding that at least one process is behaving anomalously.

20. The computer system of claim 17 further comprising means for performing at least one additional step concerning the at least one process responsive to determining that the at least one process is behaving anomalously, the at least one additional step being from a group of steps consisting of:
    uninstalling the at least one process;
    rolling back the at least one process to an earlier version;
    scanning the at least one process for malicious code;
    scanning at least one dynamic link library associated with the at least one process for malicious code;
    scanning at least one computer on which the at least one process is executing for malicious code;
    sharing profiling information concerning the at least one process with an external source;
    alerting at least one associated user;
    transmitting corresponding information concerning the at least one process to at least one of: 1) at least one additional process and 2) an external source; and
    closing at least one network connection associated with the at least one process.

\* \* \* \* \*

UNITED STATES PATENT AND TRADEMARK OFFICE
CERTIFICATE OF CORRECTION

| | | |
|---|---|---|
| PATENT NO. | : 8,171,545 B1 | |
| APPLICATION NO. | : 11/674934 | |
| DATED | : May 1, 2012 | |
| INVENTOR(S) | : Shaun Cooley and Bruce McCorkendale | |

It is certified that error appears in the above-identified patent and that said Letters Patent is hereby corrected as shown below:

Col. 8, line 44, replace "excepted" with "expected"

Col. 10, line 57, replace "excepted" with "expected"

Col. 12, line 9, replace "excepted" with "expected"

Signed and Sealed this
Thirtieth Day of October, 2012

David J. Kappos
*Director of the United States Patent and Trademark Office*